US012699411B2

(12) United States Patent
Kamijima

(10) Patent No.: US 12,699,411 B2
(45) Date of Patent: Aug. 4, 2026

(54) REFERENCE CURRENT SOURCE

(71) Applicant: ABLIC Inc., Nagano (JP)

(72) Inventor: Yasuhiro Kamijima, Nagano (JP)

(73) Assignee: ABLIC Inc., Nagano (JP)

( * ) Notice: Subject to any disclaimer, the term of this patent is extended or adjusted under 35 U.S.C. 154(b) by 314 days.

(21) Appl. No.: 18/491,809

(22) Filed: Oct. 23, 2023

(65) Prior Publication Data

US 2024/0176379 A1 May 30, 2024

(30) Foreign Application Priority Data

Nov. 29, 2022 (JP) ................................ 2022-189754

(51) Int. Cl.
*G05F 3/24* (2006.01)
*G05F 1/46* (2006.01)

(52) U.S. Cl.
CPC .............. *G05F 3/245* (2013.01); *G05F 1/468* (2013.01)

(58) Field of Classification Search
CPC . G05F 3/245; G05F 3/247; G05F 3/26; G05F 3/262; G05F 3/242; G05F 3/24; G05F 1/468; G05F 1/54; G05F 1/56; G05F 1/46; G05F 1/462
See application file for complete search history.

(56) References Cited

U.S. PATENT DOCUMENTS 4,609,833 A 9/1986 Guterman
5,587,655 A * 12/1996 Oyabe .................... G05F 3/262 323/907
6,377,113 B1 * 4/2002 Kanno .................... G05F 3/242 327/543
7,199,647 B2 * 4/2007 Tanizawa ................ G05F 3/205 327/543
2001/0020844 A1 9/2001 Andoh et al.
(Continued)

FOREIGN PATENT DOCUMENTS

CN 101135918 3/2008
JP H06149398 5/1994
JP H0863245 3/1996
(Continued)

OTHER PUBLICATIONS

"Search Report of Europe Counterpart Application", issued on Apr. 22, 2024, p. 1-p. 10.

*Primary Examiner* — Nguyen Tran
(74) *Attorney, Agent, or Firm* — JCIPRNET

(57) ABSTRACT

A reference current source 100 includes a reference voltage circuit 110, generating a reference voltage Vref; a voltage division circuit 130, dividing the reference voltage Vref and outputting a divided voltage Vdiv; and an output MOS transistor 140, supplying a reference current Iref in response to the divided voltage Vdiv being applied to a gate terminal 140G. The reference voltage circuit 110 includes a depletion type MOS transistor 111, and an enhancement type MOS transistor 112 having same conductivity type and impurity concentration as a channel 111*c* of the depletion type MOS transistor 111 and a different Fermi level from a gate electrode 111*g* of the depletion type MOS transistor 111. The voltage division circuit 130 outputs the divided voltage Vdiv within a voltage range which is 0V or above and lower than a cross point X to the gate terminal 140G of the output MOS transistor 140.

2 Claims, 12 Drawing Sheets

(56) References Cited

U.S. PATENT DOCUMENTS

| | | | | |
|---|---|---|---|---|
| 2002/0163385 | A1 | 11/2002 | Ikeda | |
| 2019/0244956 | A1 * | 8/2019 | Yoshino | G05F 3/242 |

FOREIGN PATENT DOCUMENTS

| | | |
|---|---|---|
| JP | 2001284464 | 10/2001 |
| JP | 2002124835 | 4/2002 |
| JP | 2007219901 | 8/2007 |

* cited by examiner

REFERENCE CURRENT SOURCE

CROSS-REFERENCE TO RELATED APPLICATION

This application claims the priority benefits of Japanese application no. 2022-189754, filed on Nov. 29, 2022. The entirety of the above-mentioned patent application is hereby incorporated by reference herein and made a part of this specification.

BACKGROUND

Technical Field

The present invention relates to a reference current source.

Description of Related Art

Since mobile devices, wearable devices, and the like are used in various places and climates, they are required to operate stably against changes in usage environments. Many of the semiconductor chips installed in such devices include an analog circuit, and a reference current output from a reference current source is supplied to the analog circuit as a bias current.

Some reference current sources supply the reference current by performing current conversion on the reference voltage generated by a reference voltage circuit using an element provided with a highly accurate resistor. Various proposals have been made for such a reference current source with the aim of supplying a stable reference current.

For example, a reference current source has been proposed which may suppress fluctuations in the reference current even if the reference voltage generated from the reference voltage circuit fluctuates. Specifically, a feedback-type constant voltage circuit which receives the reference voltage; another feedback-type constant voltage circuit which receives the divided reference voltage; a reference resistor connected between the outputs of the feedback-type constant voltage circuits; and a reference current source which outputs a reference current based on the current flowing through the reference resistor have been proposed. In this reference current source, a voltage division circuit which divides the reference voltage is connected in parallel with the reference resistor, and by setting the composite resistance value of the voltage division circuit higher than that of the reference resistor to reduce the current flowing through the reference resistor, fluctuations in the reference current are suppressed against fluctuations in the reference voltage.

Furthermore, many proposals have been made regarding reference voltage circuits which may suppress fluctuations in the reference voltage due to changes in ambient temperature. For example, there is a reference voltage circuit which may reduce manufacturing variations by making the structure of elements which affect changes in ambient temperature common. Specifically, a reference voltage circuit has been proposed which cancels the influence of changes in conductivity coefficient in a channel by including a pair of transistors provided with gates with different Fermi levels and channels with the same conductivity type and the same impurity concentration.

SUMMARY

One aspect of the present invention is to provide a reference current source which is capable of supplying a stable reference current against changes in ambient temperature.

The reference current source in one embodiment of the present invention includes a reference voltage circuit, generating a reference voltage; a voltage division circuit, dividing the reference voltage and outputting a divided voltage; and an output MOS transistor, supplying a reference current in response to the divided voltage being applied to a gate terminal. The reference voltage circuit includes: a depletion type MOS transistor, and an enhancement type MOS transistor, having same conductivity type and impurity concentration as a channel of the depletion type MOS transistor and a different Fermi level from a gate electrode of the depletion type MOS transistor. The voltage division circuit outputs the divided voltage to a gate terminal of the output MOS transistor, and the divided voltage is within a voltage range which is 0V or above and lower than a cross point at which a gate voltage-drain current characteristic of the output MOS transistor does not depend on temperature.

One aspect of the present invention is to provide a reference current source which is capable of supplying a stable reference current against changes in ambient temperature.

DESCRIPTION OF THE EMBODIMENTS

The reference current source in one embodiment of the present invention is based on the following knowledge.

Although the reference voltage circuit in the related art is capable of suppressing manufacturing variation by making the conductivity type and the impurity concentration at channels in a pair of transistors the same, it is affected by temperature fluctuations based on differences in the Fermi level at each gate. As a result, generating a highly accurate and stable reference voltage with respect to changes in ambient temperature is difficult for this reference voltage circuit. Thus, with a reference current source using such a reference voltage circuit, supplying a stable reference current against changes in ambient temperature is difficult.

Accordingly, in the reference current source in one embodiment of the present invention, the temperature fluctuation of the reference voltage in the reference voltage circuit is canceled by the temperature fluctuation of the output MOS transistor which supplies the reference current based on that reference voltage.

Figure 1:
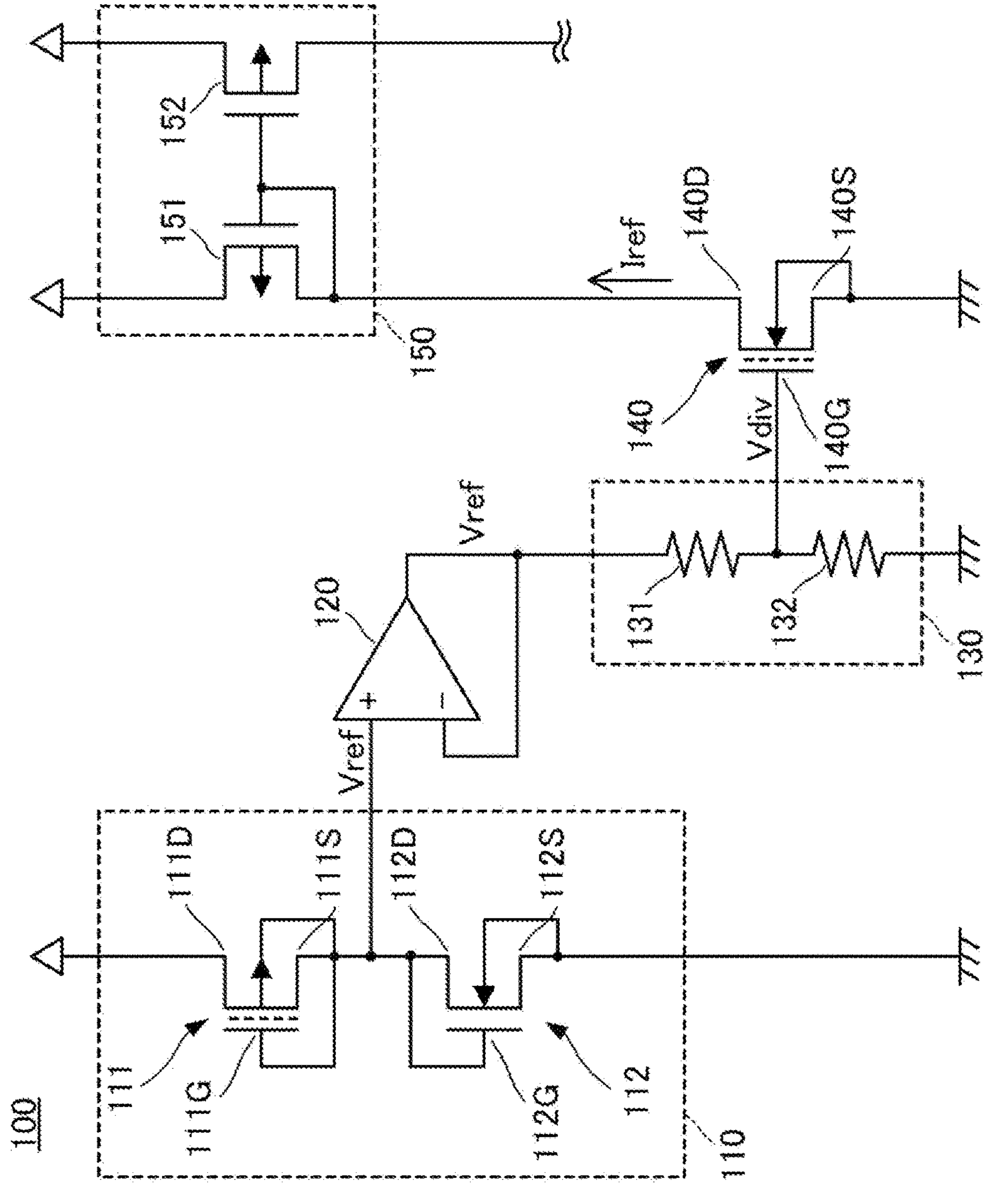
FIG. 1 is a circuit diagram illustrating the reference current source in this embodiment.

Specifically, the reference current source in this embodiment includes: a reference voltage circuit, generating a reference voltage; a voltage division circuit, dividing the reference voltage and outputting a divided voltage; and an output MOS transistor, supplying a reference current in response to the divided voltage being applied to a gate terminal (see FIG. 1). This reference voltage circuit includes a depletion type MOS transistor, and an enhancement type MOS transistor having the same conductivity type and impurity concentration at channels and different Fermi levels at gate electrodes (see FIG. 2A and FIG. 2B). As a result, the pair of transistors in this reference voltage circuit has the same channel composition, which reduces the variation of the reference voltage. However, the Fermi levels of the gate electrodes are different, resulting in a temperature characteristic in which the reference voltage decreases as the ambient temperature rises (see FIG. 5).

Figure 6:
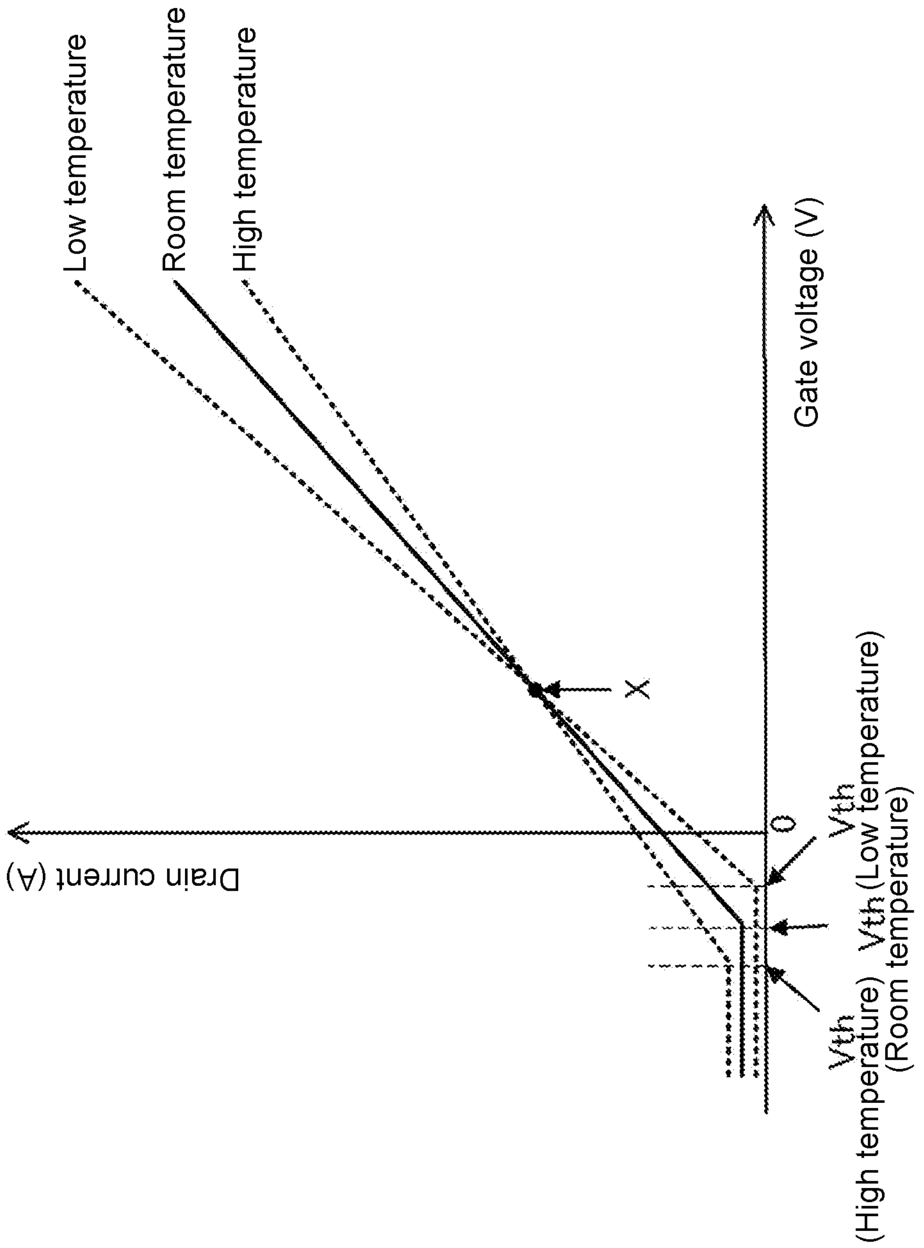
FIG. 6 is a graph illustrating the gate voltage-drain current characteristic of the output MOS transistor in this embodiment.

As illustrated in FIG. 6, the output MOS transistor has a lower threshold voltage and a smaller slope of the gate voltage-drain current characteristic as the ambient temperature rises. The threshold voltage is lowered because the depletion layer width is reduced as the Fermi level approaches the true Fermi level due to the increase in the number of carriers excited in the conduction band. Moreover, the slope of the gate voltage-drain current characteristic becomes smaller because the mobility decreases due to an increase in phonon scattering as the temperature rises. Thus, the gate voltage-drain current characteristic in the output MOS transistor has a "cross point" where the gate voltage-drain current does not change with changes in ambient temperature. The temperature characteristic of this output MOS transistor is inverted depending on whether the gate voltage is higher or lower than this cross point. In other words, in the case where the gate voltage of the output MOS transistor is lower than the cross point, the drain current increases as the ambient temperature rises; in the case where the gate voltage of the output MOS transistor is higher than the cross point, the drain current decreases as the ambient temperature rises.

Accordingly, in the reference current source of this embodiment, the reference voltage, which decreases as the ambient temperature rises, is divided and applied to the gate of the output MOS transistor, and the gate voltage of the output MOS transistor is made lower than the cross point so that the drain current increases as the ambient temperature rises. That is, the voltage division circuit which divides the reference voltage into the gate voltage of the output MOS transistor outputs a divided voltage within a voltage range which is 0V or above and lower than the cross point (see FIG. 7). As a result, since the drain current of the output MOS transistor increases even if the ambient temperature rises and the reference voltage of the reference voltage circuit decreases, this reference current source is capable of supplying a stable reference current against changes in ambient temperature.

Hereinafter, one aspect for implementing the present invention will be described in detail with reference to the drawings. In addition, in the drawings, the same component parts may be given the same signs, and redundant explanations may be omitted. Further, the X-axis, Y-axis and Z-axis illustrated in the drawings are assumed to be orthogonal to each other. The X-axis direction is sometimes referred to as "width direction," the Y-axis direction is sometimes referred to as "depth direction," and the Z-axis direction is sometimes referred to as "height direction" or "thickness direction." The face of each film in the +Z direction may be referred to as the "surface" or "top surface", and the face in the −Z direction may be referred to as the "back surface" or "bottom surface". Further, the drawings are schematic, and the width, depth, thickness ratio, etc. are not as illustrated. The quantity, position, shape, structure, size, etc. of the semiconductor element obtained by structurally combining multiple films or layers or the like are not limited to the embodiments illustrated below, but may be any quantity, position, shape, structure, size, etc. which is desirable in implementing the present invention.

FIG. 1 is a circuit diagram illustrating the reference current source in this embodiment. As illustrated in FIG. 1, the reference current source 100 includes a reference voltage circuit 110, a buffer amplifier 120, a voltage division circuit 130, an output MOS transistor 140, and a current mirror circuit 150.

The reference voltage circuit 110 outputs the reference voltage Vref to the non-inverting input port of the buffer amplifier 120. This reference voltage circuit 110 is a so-called "ED type reference voltage circuit" and includes an N-channel depletion type MOS transistor 111 and an N-channel enhancement type MOS transistor 112.

The depletion type MOS transistor 111 has a drain terminal 111D connected to a power source terminal and a gate terminal 111G connected to a source terminal 111S. In the case where a power source voltage is applied to the drain terminal 111D, the depletion type MOS transistor 111 functions as a constant current source which supplies constant current which does not depend on the power source voltage from the source terminal 111S to the enhancement type MOS transistor 112. The back gate of the depletion type MOS transistor 111 is connected to the source terminal 111S.

The enhancement type MOS transistor 112 has a gate terminal 112G connected to a drain terminal 112D, and the drain terminal 112D is connected to the source terminal 111S of the depletion type MOS transistor 111. This enhancement type MOS transistor 112 outputs a voltage based on the constant current supplied by the depletion type MOS transistor 111 as the reference voltage Vref from the drain terminal 112D to the buffer amplifier 120. The back gate of the enhancement type MOS transistor 112 is connected to the source terminal 112S.

In this way, the reference voltage circuit 110 outputs the reference voltage Vref which does not depend on the power source voltage to the buffer amplifier 120 by the pair of transistors including the depletion type MOS transistor 111 and the enhancement type MOS transistor 112. The structures of the depletion type MOS transistor 111 and the enhancement type MOS transistor 112 and the operation of the reference voltage circuit 110 will be described later.

In the buffer amplifier 120, the non-inverting input port receives the reference voltage Vref output from the reference voltage circuit 110, the inverting input port is connected to the output port, and a voltage which is substantially the same as the reference voltage Vref is output.

The voltage division circuit 130 is a combination of resistors 131 and 132 connected in series, and a predetermined voltage division ratio is set based on the ratio of the resistance values thereof. This voltage division circuit 130 divides the reference voltage Vref output from the buffer amplifier 120, and the divided voltage Vdiv is output to the gate terminal 140G of the output MOS transistor 140.

The range of the divided voltage according to the predetermined voltage division ratio is 0V or above and lower than a cross point at which a gate voltage-drain current characteristic of the output MOS transistor 140 does not depend on temperature. Since the threshold voltage of the output MOS transistor 140 is a negative value, the lower limit of the divided voltage Vdiv is 0V or above. As a result, even if the ambient temperature rises and the reference voltage Vref of the reference voltage circuit 110 decreases, since the drain current of the output MOS transistor 140 increases, a stable reference current is supplied against changes in ambient temperature.

Further, the divided voltage Vdiv may be a voltage which cancels a temperature fluctuation of the reference voltage Vref so that a drain current of the output MOS transistor 140 does not fluctuate with temperature.

The output MOS transistor 140 is a depletion type MOS transistor, with a gate terminal 140G connected to the output of the voltage division circuit 130, a drain terminal 140D connected to a current mirror circuit 150, and a source terminal 140S grounded. In this output MOS transistor 140, the gate terminal 140G receives the divided voltage Vdiv output from the voltage division circuit 130, and the reference current Iref is supplied from the drain terminal 140D to the current mirror circuit 150 based on the divided voltage Vdiv. In other words, the output MOS transistor 140 supplies the reference current Iref in response to the divided voltage Vdiv being applied to the gate terminal 140G. Further, the output MOS transistor 140 does not supply a current which reaches the reference current Iref unless the divided voltage Vdiv is applied to the gate terminal 140G.

The current mirror circuit 150 includes MOS transistors 151 and 152. The MOS transistor 151 has a gate terminal connected to a source terminal and a drain terminal connected to the power source terminal. The MOS transistor 152 has a gate terminal connected to the gate terminal of the MOS transistor 151 and a drain terminal connected to the power source terminal and supplies the reference current Iref from the source terminal.

<Temperature Characteristic of Reference Current>

Next, the temperature characteristic of the reference current in this embodiment will be described. In one embodiment of the present invention, in order to supply a stable reference current Iref against changes in ambient temperature, the temperature characteristic of the reference voltage circuit 110 is canceled by the temperature characteristic of the output MOS transistor 140. Thus, first, the temperature characteristic of the reference voltage generated by the reference voltage circuit 110 will be described.

—Temperature Characteristic of Reference Voltage—

The temperature characteristic of the reference voltage generated by the reference voltage circuit 110 depends on the temperature characteristics of the depletion type MOS transistor 111 and the enhancement type MOS transistor 112. Thus, the structures and temperature characteristics of the depletion type MOS transistor 111 and the enhancement type MOS transistor 112 will be described while also describing the operation principle of the reference voltage circuit 110.

Figure 2A:
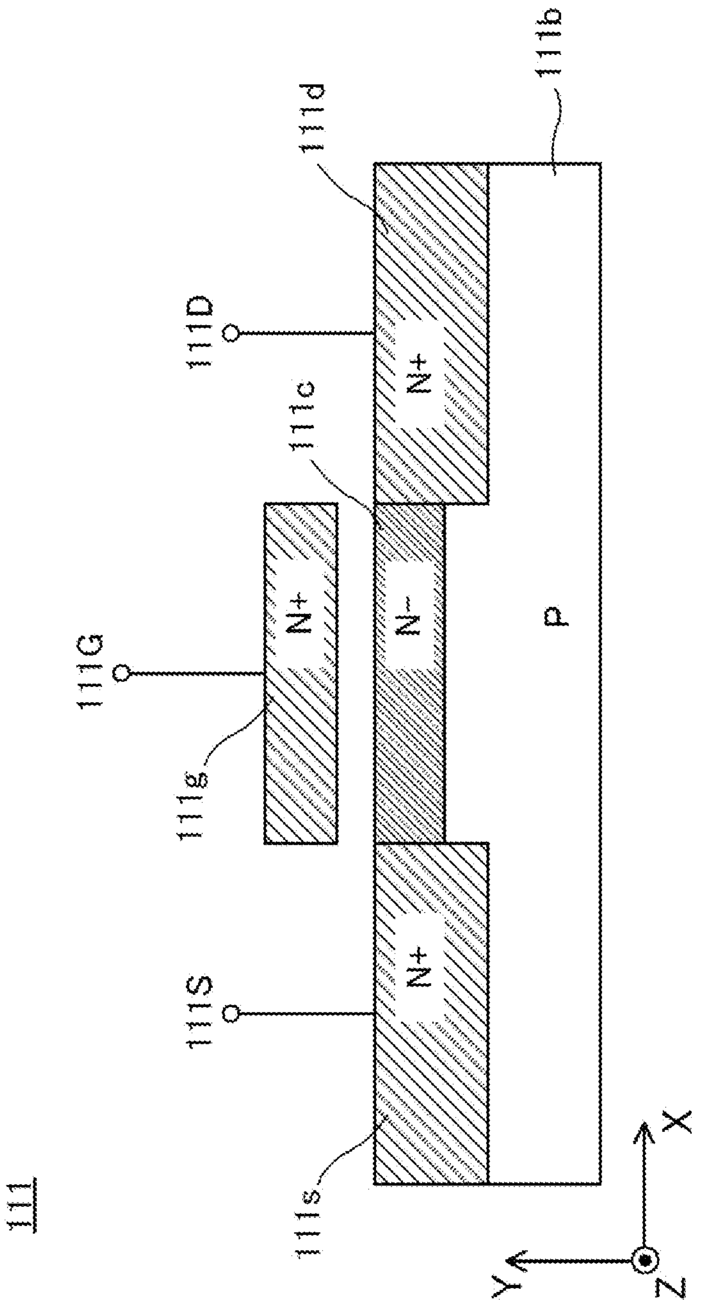
FIG. 2A is a schematic cross-sectional view illustrating the depletion type MOS transistor of the reference voltage circuit illustrated in FIG. 1.

FIG. 2A is a schematic cross-sectional view illustrating the depletion type MOS transistor of the reference voltage circuit illustrated in FIG. 1. As illustrated in FIG. 2A, the depletion type MOS transistor 111 has a gate electrode 111*g*, a drain area 111*d*, and a source area 111*s*, which are connected to the gate terminal 111G, the drain terminal 111D, and the source terminal 111S illustrated in FIG. 1, respectively.

Figure 3:
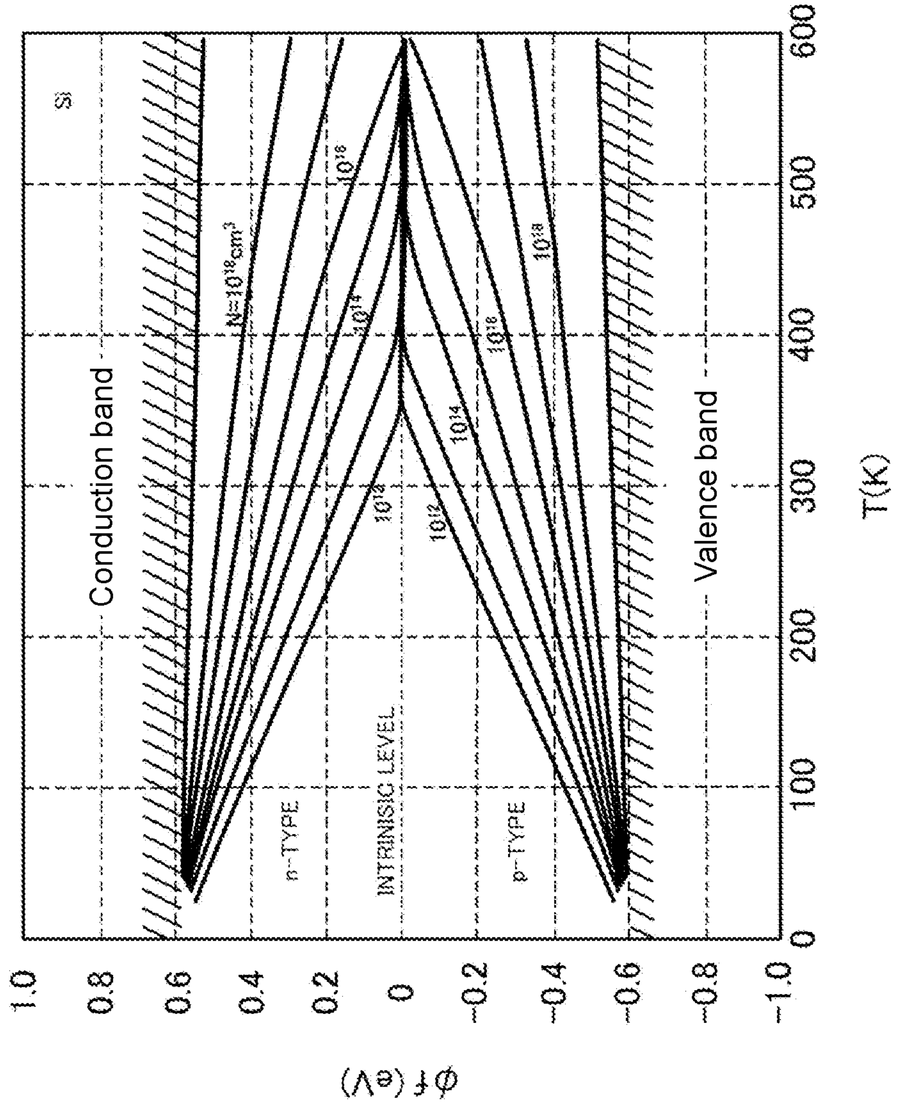
FIG. 3 is a band diagram illustrating the dependence of Fermi level on temperature and impurity concentration in silicon.

The gate electrode 111*g* is of the N+ type, injected with a high concentration of phosphorus, and has a Fermi level close to the conduction band in the band diagram of FIG. 3. The channel 111*c* located below the gate electrode 111*g* is of the N− type conductivity type on the surface of the P type silicon substrate 111*b* and is injected with a low concentration of phosphorus. As a result, even if the potential difference between the gate and the source is 0V, this N− type channel 111*c* has a current path formed between the N+ type drain area 111*d* and the N+ type source area 111*s* of the same conductivity type.

Figure 2B:
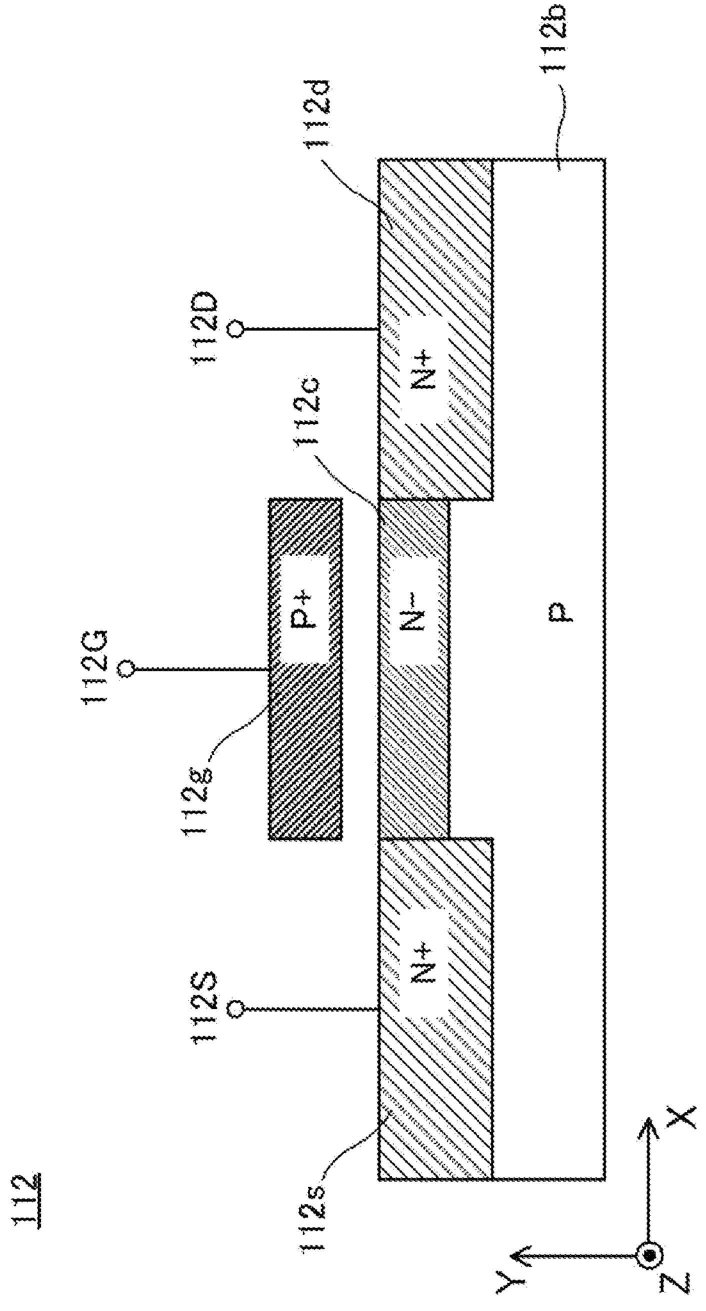
FIG. 2B is a schematic cross-sectional view illustrating the enhancement type MOS transistor of the reference voltage circuit illustrated in FIG. 1.

FIG. 2B is a schematic cross-sectional view illustrating the enhancement type MOS transistor of the reference voltage circuit illustrated in FIG. 1. As illustrated in FIG. 2B, the enhancement type MOS transistor 112 has a gate electrode 112*g*, a drain area 112*d*, and a source area 112*s*, which are connected to the gate terminal 112G, the drain terminal 112D, and the source terminal 112S illustrated in FIG. 1, respectively.

The gate electrode 112*g* is of the P+ type, injected with a high concentration of boron, and has a Fermi level close to the valence band in the band diagram of FIG. 3. The channel 112*c* located below the gate electrode 112*g* is of the N− type conductivity type on the surface of the P type silicon substrate 112*b* and is injected with a low concentration of phosphorus by the same process as the channel 111*c* of the depletion type MOS transistor 111. Thus, the channel 112*c* has the same conductivity coefficient as the channel 111*c* and the same temperature coefficient of that conductivity coefficient. Further, in the channel 112*c*, since the Fermi level of the gate electrode 112*g* is close to the valence band, the Fermi level is pulled up to the valence band and depleted. As a result, in the case where the potential difference between the gate and the source is 0V, this N− type channel 112*c* has a current path which is not formed between the N+ type drain area 112*d* and the N+ type source area 112*s* of the same conductivity type.

In this respect, the enhancement type MOS transistor 112 differs from a general enhancement type MOS transistor in which the channel is not impurity injected. Further, since the channel 112*c* has the same conductivity coefficient as the channel 111*c* and the same temperature coefficient of that conductivity coefficient, manufacturing variations in each channel of the depletion type MOS transistor 111 and the enhancement type MOS transistor 112 may be reduced. On the other hand, since the Fermi levels of the gate electrodes of the depletion type MOS transistor 111 and the enhancement type MOS transistor 112 are different, according to the operation principle of the "ED type reference voltage circuit", the reference voltage Vref decreases as the ambient temperature rises.

Figure 4:
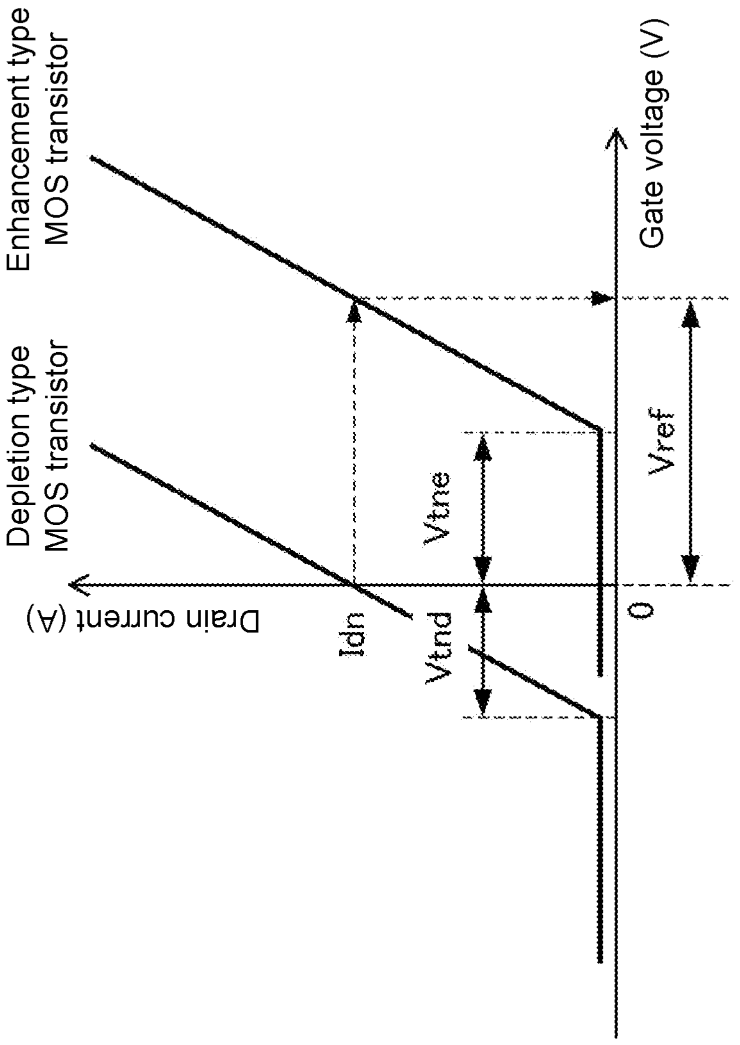
FIG. 4 is a graph illustrating the gate voltage-drain current characteristics of the depletion type MOS transistor and the enhancement type MOS transistor in this embodiment.

Next, the temperature characteristic of the reference voltage Vref in this embodiment will be described. FIG. 4 is a graph illustrating the gate voltage-drain current characteristics of the depletion type MOS transistor and the enhancement type MOS transistor in this embodiment. In FIG. 4, the horizontal axis is the gate voltage, and the vertical axis is the drain current. FIG. 4 further illustrates the gate voltage-drain current characteristics of the depletion type MOS transistor 111 and the enhancement type MOS transistor 112.

As illustrated in FIG. 4, since the depletion type MOS transistor 111 has an N− type channel 111*c* (see FIG. 2A), the threshold voltage Vtnd is lower than 0V. Further, since the depletion type MOS transistor 111 is connected to the gate terminal 111G and the drain terminal 111D (see FIG. 1), the potential difference (gate voltage) between gate and the source becomes 0V. Thus, the depletion type MOS transistor 111 supplies the drain current Idn, which is a constant current independent to the power source voltage and utilizing the saturation current characteristic, to the enhancement type MOS transistor 112.

The enhancement type MOS transistor 112 generates the reference voltage Vref according to the drain current Idn supplied from the depletion type MOS transistor 111. This reference voltage Vref is expressed by the following equation: Vref=|Vtnd|+Vtne.

In the reference voltage circuit 110, since each channel of the depletion type MOS transistor 111 and the enhancement type MOS transistor 112 has the same conductivity type and impurity concentration, the conductivity coefficient and the temperature coefficient thereof are the same. As a result, the reference voltage Vref has a temperature characteristic in which the factors of variation based on the conductivity type and impurity concentration of each channel are suppressed. On the other hand, since each gate of the depletion type MOS transistor 111 and the enhancement type MOS transistor 112 has different conductivity types and also different impurity concentrations, the Fermi levels are not the same as illustrated in FIG. 3.

Thus, in the depletion type MOS transistor 111 and the enhancement type MOS transistor 112, although the factors caused by each channel may be suppressed, the factor based on differences in conductivity type and impurity concentration at each gate still remains, and there is the temperature characteristic due to the differences in gate.

Figure 5:
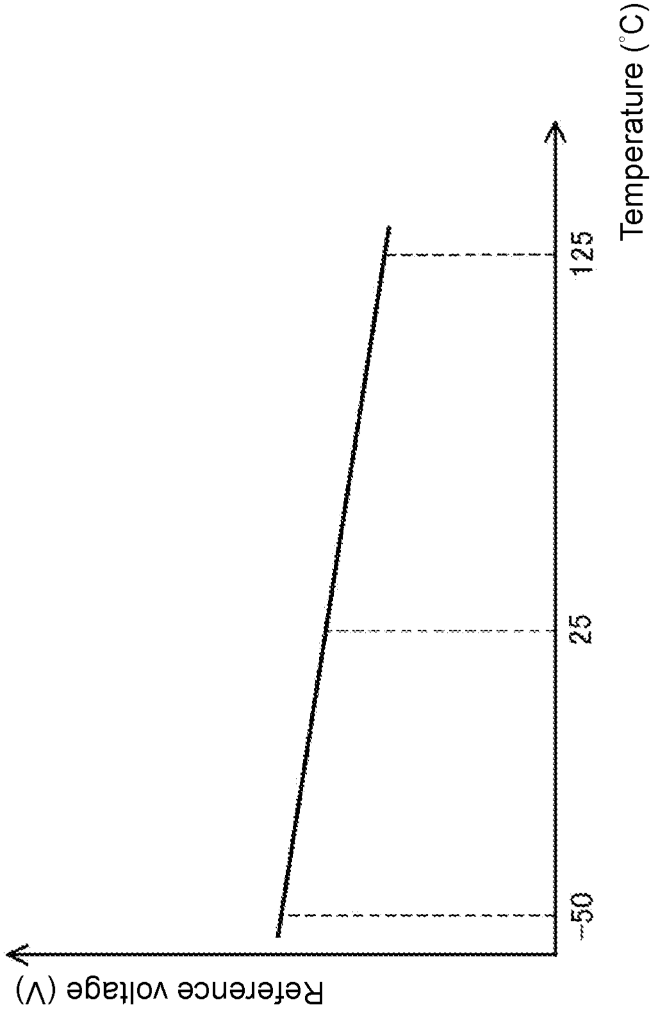
FIG. 5 is a graph illustrating the temperature characteristic of the reference voltage of the reference voltage circuit in this embodiment.

FIG. 5 is a graph illustrating the temperature characteristic of the reference voltage of the reference voltage circuit in this embodiment. As illustrated in FIG. 5, the reference voltage Vref has a temperature characteristic which decreases as the ambient temperature rises. This means that, as illustrated in the band diagram of FIG. 3, since the N+ type impurity concentration of the gate electrode 111*g* of the depletion type MOS transistor 111 becomes thinner as the ambient temperature rises, the threshold voltage Vtnd increase (positive direction) and the absolute value |Vtnd| of the threshold voltage decrease. Further, since the P+ type impurity concentration of the gate electrode 112*g* of the enhancement type MOS transistor 112 becomes thinner as the ambient temperature rises, the threshold voltage Vtne decreases (minus direction). Then, the reference voltage Vref has a temperature characteristic which decreases as the ambient temperature rises according to the following equation: Vref=|Vtnd|+Vtne.

Thus, the reference voltage Vref of the reference voltage circuit 110 has a temperature characteristic which decreases as the ambient temperature rises, and is divided by the voltage division circuit 130 through the buffer amplifier 120 and applied to the gate terminal 140G of the output MOS transistor 140 as the gate voltage (see FIG. 1).

—Temperature Characteristic of Output MOS Transistor—

FIG. 6 is a graph illustrating the gate voltage-drain current characteristic of the output MOS transistor in this embodiment. As illustrated in FIG. 6, the output MOS transistor 140 is similar to general MOS transistors. In the case where the gate voltage is lower than or equal to the threshold voltage Vth, the drain current does not flow; in the case where the gate voltage exceeds the threshold voltage Vth, a drain current with a slope based on the conductivity coefficient flows. Also, as the ambient temperature rises, the threshold voltage Vth and the conductivity coefficient decrease, and the slope of the gate voltage-drain current characteristic decreases. Thus, there exists a cross point X where the gate voltage-drain current characteristic does not exhibit the temperature characteristic. In the case where a gate voltage below the cross point X is applied, the drain current increases as the ambient temperature rises; in the case where a gate voltage exceeding the cross point is applied, the drain current decreases as the ambient temperature rises.

In this embodiment, the reference voltage Vref decreases as the ambient temperature rises in the reference voltage circuit 110, while the drain current, which is the reference current, is increased by applying a gate voltage which is lower than the cross point X in the output MOS transistor 140. As a result, the temperature characteristic of the reference current generated from the reference current source 100 is able to be made smaller.

Figure 7:
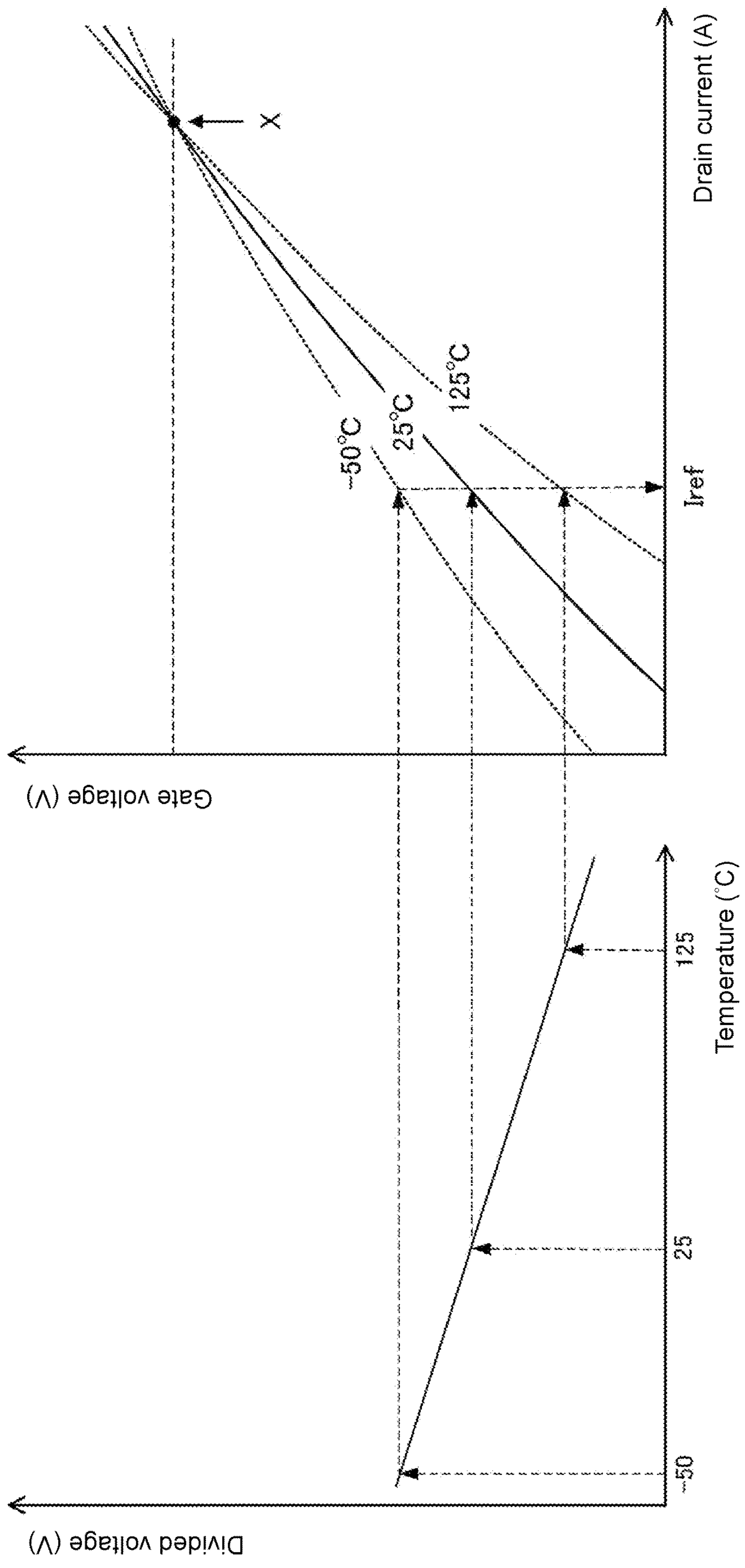
FIG. 7 is an explanatory diagram illustrating the temperature characteristic of the reference current supplied by the output MOS transistor in this embodiment.

FIG. 7 is an explanatory diagram illustrating the temperature characteristic of the reference current supplied by the output MOS transistor in this embodiment. In FIG. 7, the graph on the left illustrates the temperature characteristic of the divided voltage Vdiv obtained by dividing the reference voltage Vref by the voltage division circuit 130 as illustrated in FIG. 5. The graph on the right illustrates the temperature characteristic of the output MOS transistor 140 obtained by exchanging the vertical and horizontal axes of the gate voltage-drain current characteristic illustrated in FIG. 6 and enlarging the vicinity of the cross point X. FIG. 7 illustrates the relationship between the temperature characteristic of the divided voltage Vdiv (reference voltage Vref) output from the voltage division circuit 130 and the temperature characteristic of the drain current (reference current Iref) in the case where this divided voltage Vdiv is applied to the gate terminal 140G of the output MOS transistor 140. It should be note that the temperature characteristics of the buffer amplifier 120 and the voltage division circuit 130 are not considered here.

As illustrated in FIG. 7, in the reference current source 100, the voltage division ratio of the voltage division circuit 130 is adjusted, and a gate voltage lower than the cross point X illustrated in FIG. 6 is set to be applied to the gate of the output MOS transistor 140. The reference voltage Vref output by the reference voltage circuit 110 decreases as the ambient temperature rises, so the gate voltage of the output MOS transistor 140 applied through the voltage division circuit 130 also decreases as the ambient temperature rises. Then, as the ambient temperature rises, the gate voltage decreases, but the drain current increases accordingly, resulting in less dependence of the reference current Iref on the temperature.

In this way, since the drain current of the output MOS transistor 140 increases even if the ambient temperature rises and the reference voltage Vref of the reference voltage circuit 110 decreases, this reference current source 100 is capable of supplying a stable reference current Iref against changes in ambient temperature.

Next, a specific example will be described with reference to FIG. 8 to FIG. 10 in addition to FIG. 1. In the depletion type MOS transistor 111, the gate electrode 111*g* was of the N+ type with a concentration of $1.0\times10^{20}$ atoms/$cm^3$ or more, and the thickness of the gate oxide film was 25 nm.

Also, in the depletion type MOS transistor 111, the impurity concentration at the channel 111*c* was adjusted so that the threshold voltage Vtnd was −0.29V. Then, the temperature characteristic of the gate voltage-drain current characteristic per unit channel length and unit channel width of the depletion type MOS transistor 111 is illustrated in FIG. 8. The gate voltage at the cross point X was 0.22V. The enhancement type MOS transistor 112 was the same as the depletion type MOS transistor 111 except that the gate electrode 112*g* was of a P+ type.

Figure 9:
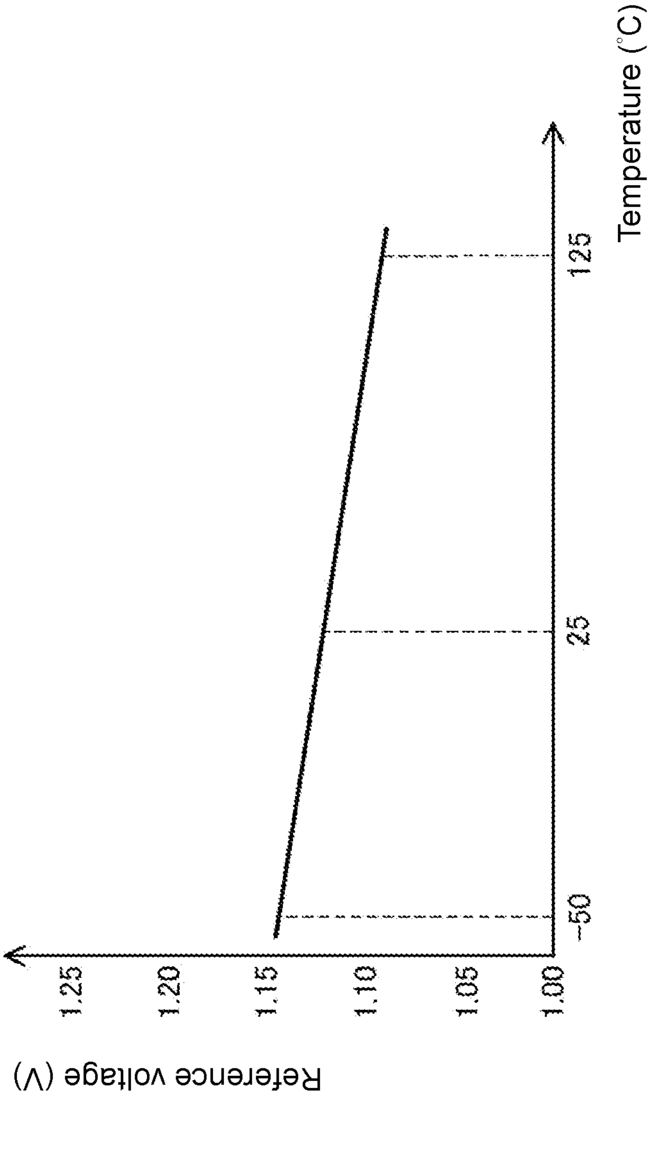
FIG. 9 is a graph illustrating one example of the gate voltage-drain current characteristic of the output MOS transistor.
Figure 10:
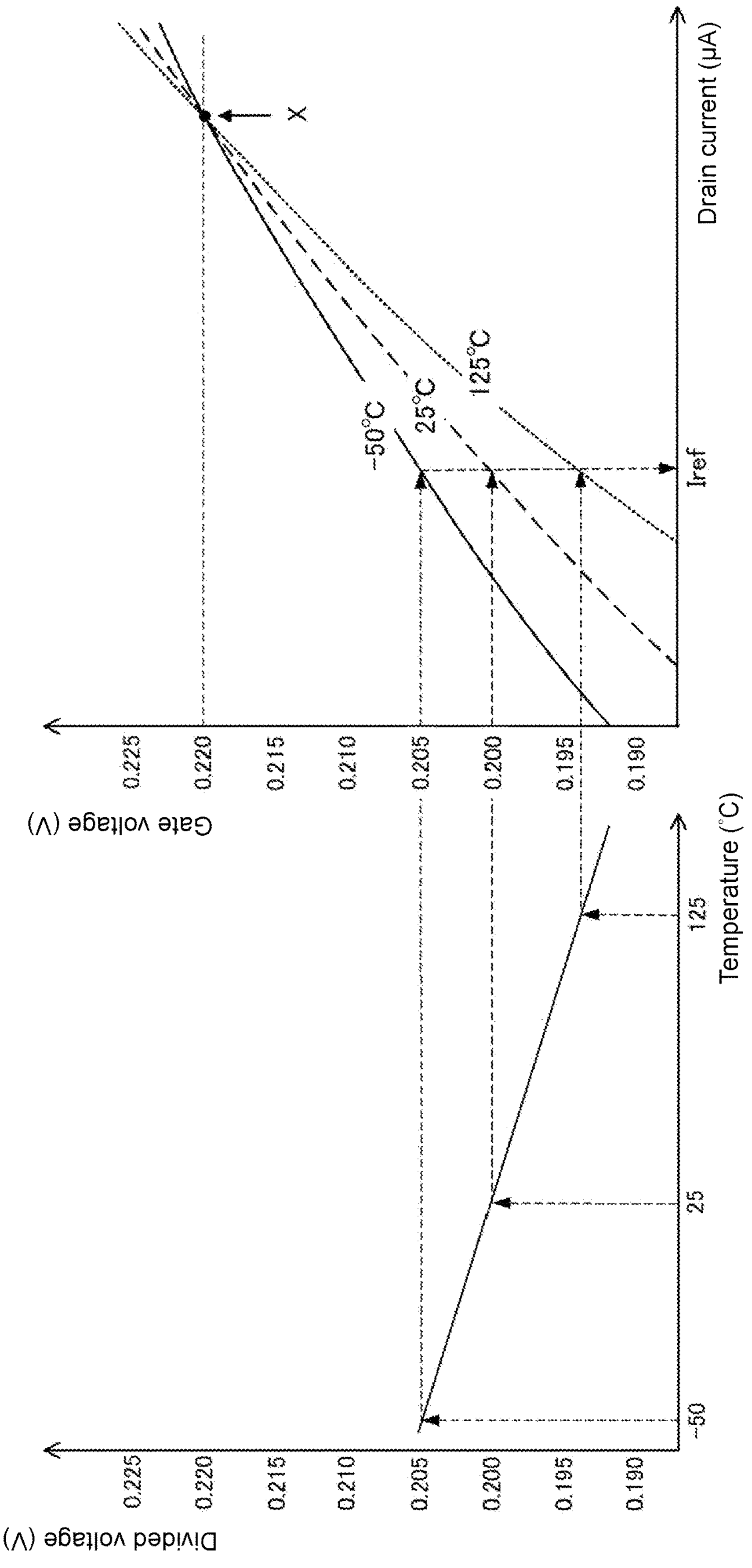
FIG. 10 is an explanatory diagram illustrating one example the temperature characteristic of the reference current supplied by the output MOS transistor.

In the case where the reference voltage circuit 110 was formed by these depletion type MOS transistor 111 and enhancement type MOS transistor 112, as illustrated in FIG. 9, the reference voltage Vref was 1.13V at room temperature (25° C.), and the temperature characteristic was −0.35 mV/° C.

The voltage division circuit 130 divided this reference voltage Vref at a voltage division ratio of 0.82:0.18 and output a divided voltage Vdiv of 0.20V to the output MOS transistor 140 at room temperature (25° C.). Further, the temperature characteristic of the divided voltage Vdiv is illustrated in the graph on the left of FIG. 10.

Figure 8:
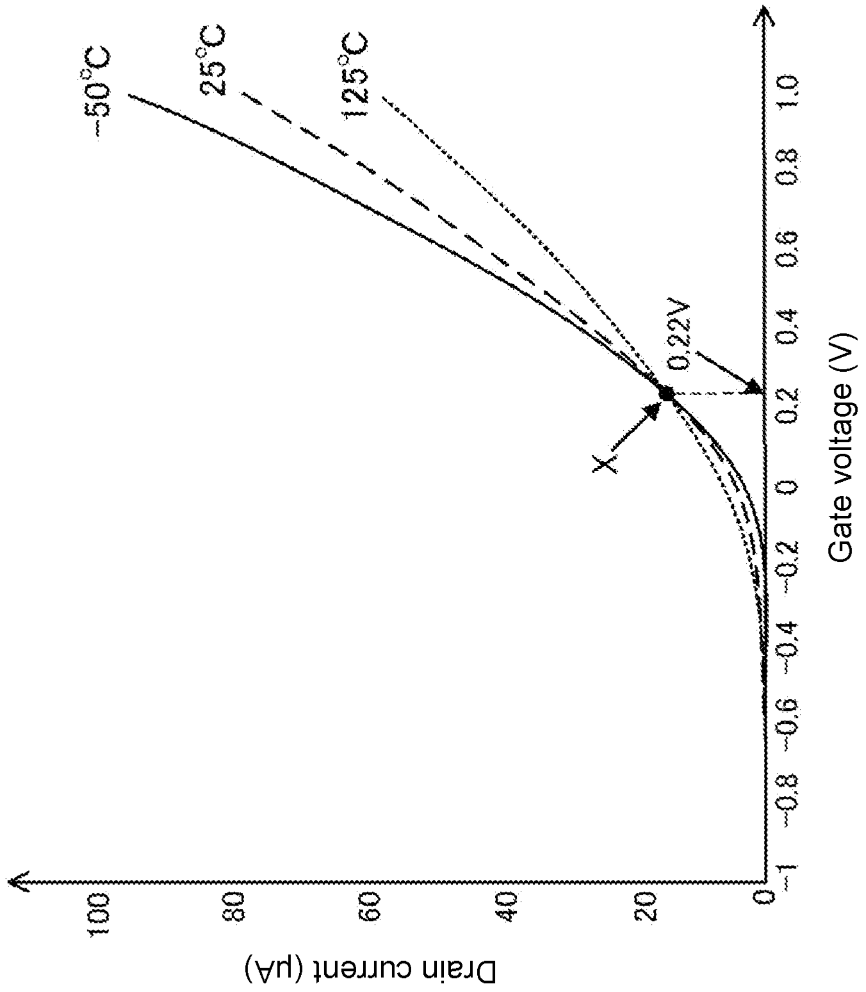
FIG. 8 is a graph illustrating one example of the temperature characteristic of the reference voltage of the reference voltage circuit.

Since the output MOS transistor 140 was formed by the same process as the depletion type MOS transistor 111, the gate voltage-drain current characteristic was the same as the depletion type MOS transistor 111 (see FIG. 8). That is, the gate terminal 140G of the output MOS transistor 140*a* received the divided voltage Vdiv of 0.20V, which is lower than the gate voltage of 0.22V as the cross point X, at room temperature (25° C.). Then, as illustrated in FIG. 10, the reference current source 100 was able to supply the drain current, that is, the reference current Iref, in which temperature fluctuations were sufficiently suppressed.

The divided voltage Vdiv which should be applied to the gate terminal so as to suppress the temperature fluctuations changes as the threshold voltage of the output MOS transistor 140 changes. In this specific example, the threshold voltage of the output MOS transistor 140 was −0.29V, the voltage at the cross point X was 0.22V, and the difference therebetween was 0.51V. By setting a predetermined voltage division ratio to obtain a divided voltage which is, for any threshold voltage, added with a difference (0.49V) which is smaller than the difference (0.51V) with the voltage at the cross point X, the reference current source 100 is capable of supplying a stable reference current Iref against the changes in ambient temperature.

Modified Example

To make the divided voltage Vdiv to be 0V or above and the gate voltage-drain current characteristic of the output MOS transistor 140 to be a voltage lower than the cross point X, the voltage division circuit 130 may be provided with a trimming circuit which is capable of adjusting the divided voltage Vdiv.

Figure 11:
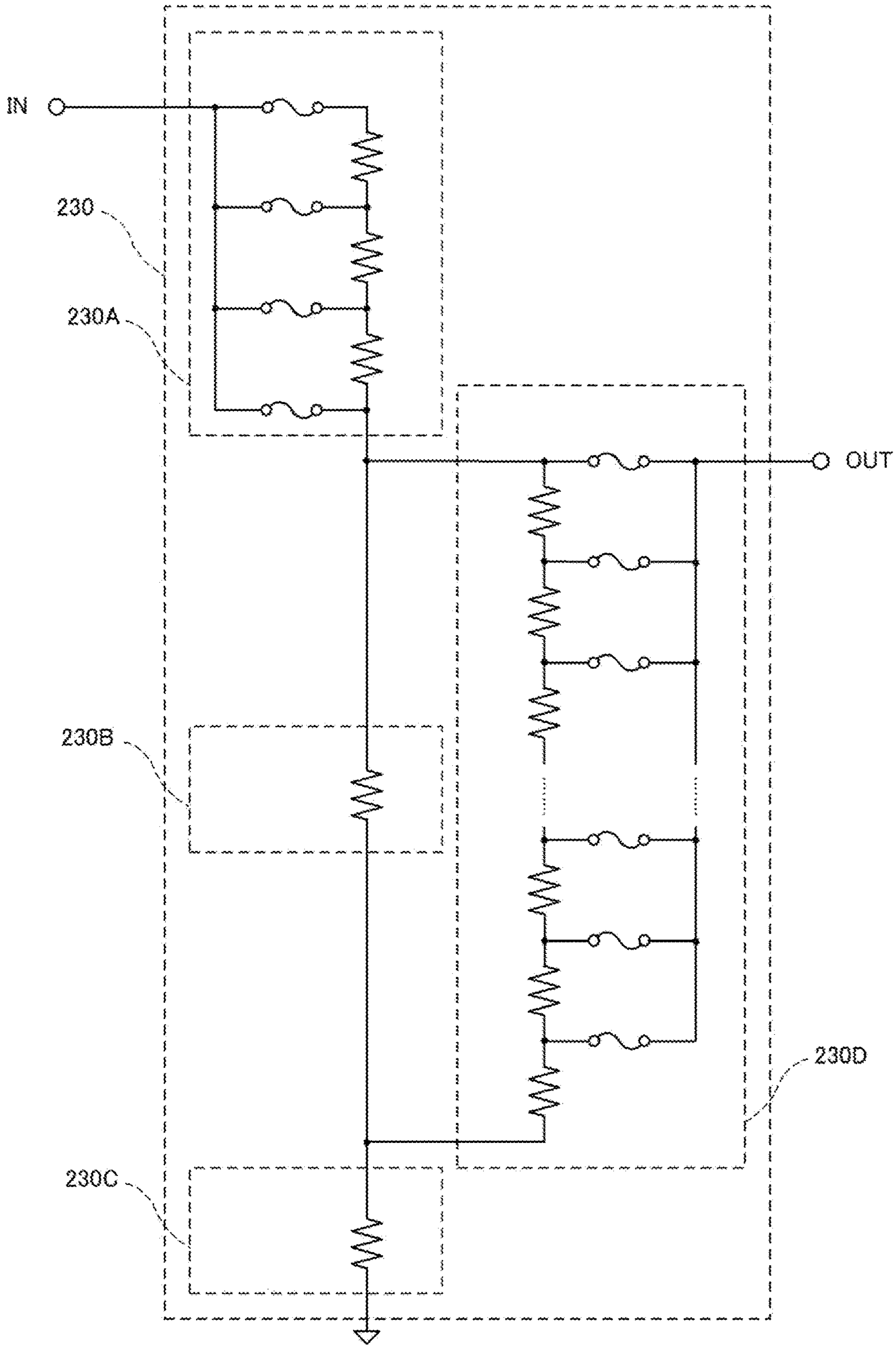
FIG. 11 is a circuit diagram illustrating another example of the voltage division circuit illustrated in FIG. 1.

Specifically, as illustrated in FIG. 11, the voltage division circuit 230 includes a first resistor part 230A, a second resistor part 230B, a third resistor part 230C, and a fourth resistor part 230D. The first resistor part 230A, the second resistor part 230B, and the third resistor part 230C are connected in series. The fourth resistor part 230D is connected in parallel to the third resistor part 230C.

The first resistor part 230A includes multiple resistance elements connected in series and a fuse connected to each node of the resistance elements. This first resistor part 230A performs rough adjustment of the divided voltage Vdiv by selectively cutting the fuse. The fourth resistor part 230D includes multiple resistance elements connected in series and a fuse connected to each node of the resistance elements. This fourth resistor part 230D divides the potential difference in the fourth resistor part 230D into fine steps by multiple resistance elements, and by selectively cutting the fuse, the divided voltage Vdiv is finely adjusted and output from the OUT terminal. In this modified example, a fuse is used, but the present invention is not limited thereto, and a switching element or the like may be used.

In this way, the voltage division circuit 230 provided with the trimming circuit is capable of finely adjusting the divided voltage Vdiv, thereby supplying a stable reference current Iref against changes in ambient temperature with high accuracy.

As described above, the reference current source in one embodiment of the present invention includes a reference voltage circuit, generating a reference voltage; a voltage division circuit, dividing the reference voltage and outputting a divided voltage; and an output MOS transistor, supplying a reference current in response to the divided voltage being applied to a gate terminal. This reference voltage circuit includes a depletion type MOS transistor and an enhancement type MOS transistor having the same conductivity type and impurity concentration at channels and different Fermi levels at gate electrodes. In this way, the reference voltage has a temperature characteristic which decreases as the ambient temperature rises. Further, the voltage division circuit outputs the divided voltage within a voltage range which is 0V or above and lower than a cross point to a gate terminal of the output MOS transistor. As a result, the temperature characteristic of the reference voltage may be canceled by making the gate voltage-drain current characteristic of the output MOS transistor a temperature characteristic which increases as the temperature rises. Thus, a reference current source in one embodiment of the present invention may supply a stable reference current against changes in ambient temperature.

What is claimed is:

1. A reference current source, comprising:

a reference voltage circuit, generating a reference voltage;

a buffer amplifier including an output terminal and a non-inverting input terminal connecting to the reference voltage circuit to receive the reference voltage;

a voltage division circuit, connecting to the output terminal of the buffer amplifier and dividing the reference voltage and outputting a divided voltage; and an output MOS transistor, supplying a reference current in response to the divided voltage being applied to a gate terminal, wherein the reference voltage circuit comprises:

a depletion type MOS transistor; and an enhancement type MOS transistor, having same conductivity type and impurity concentration as a channel of the depletion type MOS transistor and a different Fermi level from a gate electrode of the depletion type MOS transistor, wherein the voltage division circuit outputs the divided voltage to a gate terminal of the output MOS transistor, wherein the divided voltage is within a voltage range which is above OV and lower than a cross point at which a gate voltage-drain current characteristic of the output MOS transistor does not depend on temperature in order that a positive temperature coefficient of a drain current of the output MOS transistor cancels a negative temperature coefficient of the reference voltage, wherein the divided voltage cancels a temperature characteristic of the reference voltage so that the drain current of the output MOS transistor does not fluctuate with temperature.

2. The reference current source according to claim 1, wherein the voltage division circuit comprises a trimming circuit capable of adjusting the divided voltage.

* * * * *